A. THOMSON.
MULTIPLE EXPANSION ROTARY STEAM ENGINE, WATER WHEEL, AND GASOLENE ENGINE MUFFLER.
APPLICATION FILED APR. 15, 1916.

1,238,457.  Patented Aug. 28, 1917.
2 SHEETS—SHEET 1.

Inventor
A. THOMSON,

By Watson E. Coleman
Attorney

A. THOMSON.
MULTIPLE EXPANSION ROTARY STEAM ENGINE, WATER WHEEL, AND GASOLENE ENGINE MUFFLER.
APPLICATION FILED APR. 15, 1916.
1,238,457.
Patented Aug. 28, 1917.
2 SHEETS—SHEET 2.
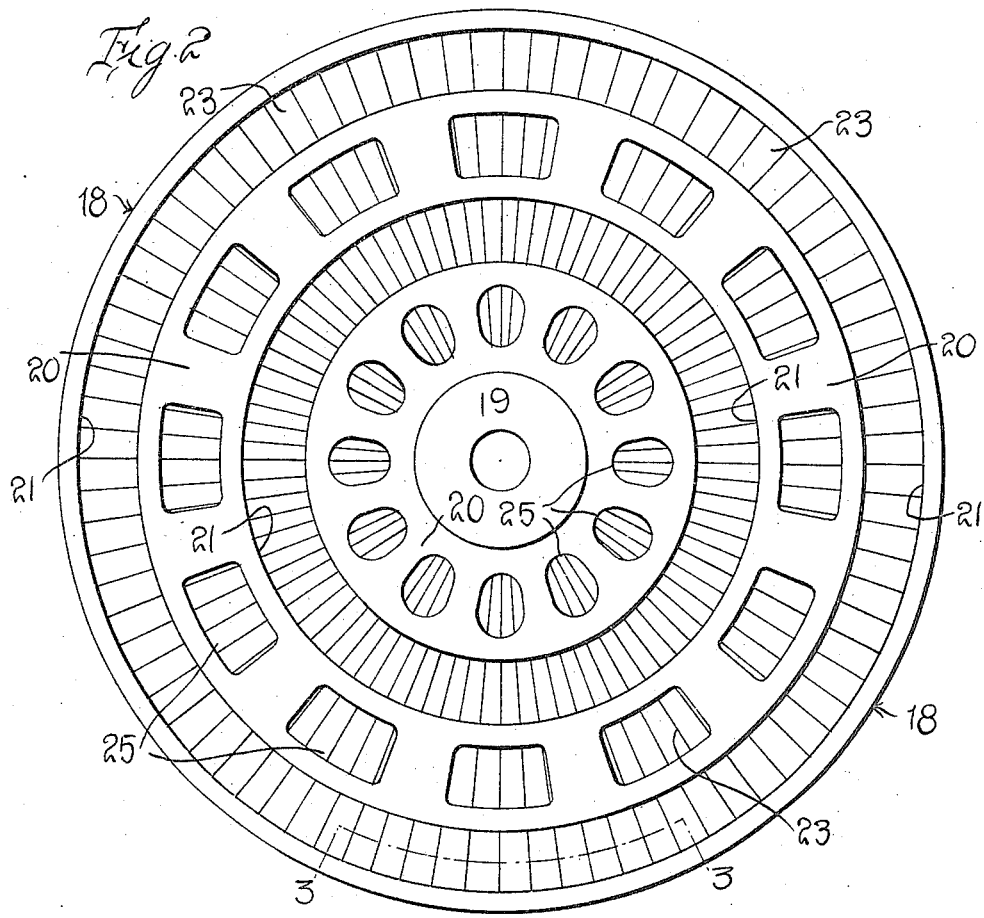
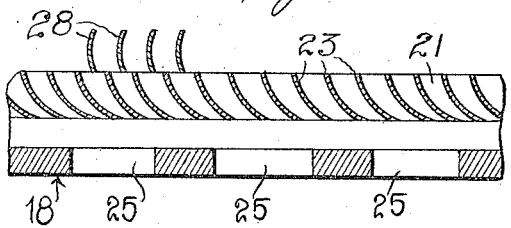
Inventor
A. Thomson,
By Watson E. Coleman
Attorney

UNITED STATES PATENT OFFICE.

ALEXANDER THOMSON, OF LAKE CHARLES, LOUISIANA.

MULTIPLE-EXPANSION ROTARY STEAM-ENGINE, WATER-WHEEL, AND GASOLENE-ENGINE MUFFLER.

1,238,457.   Specification of Letters Patent.   Patented Aug. 28, 1917.

Application filed April 15, 1916.   Serial No. 91,379.

*To all whom it may concern:*

Be it known that I, ALEXANDER THOMSON, a citizen of the United States, residing at Lake Charles, in the parish of Calcasieu and State of Louisiana, have invented certain new and useful Improvements in Multiple-Expansion Rotary Steam-Engines, Water-Wheels, and Gasolene-Engine Mufflers, of which the following is a specification, reference being had to the accompanying drawings.

This invention relates to rotary engines and more particularly to that type of such engines commonly known in the art as steam turbines.

It is the primary object of the invention to produce an engine of the above character wherein the several parts are very compactly arranged, thus enabling the engine to be erected and maintained at nominal expense and operated without necessitating the services of a skilled engineer.

It is an additional object of my invention to produce a rotary turbine engine whereby the full expansive force of the steam or other motive fluid is utilized to the best advantage.

It is a further general object of the invention to devise an apparatus as above explained, which, in addition to its use as a power generating engine, may also be serviceably employed as a muffler for a gasolene engine wherein the expansion of the exhaust gases is converted into a driving impulse which is transmitted to the engine shaft.

With the above and other objects in view, my invention consists in the novel features of construction, combination and arrangement of parts to be hereinafter more fully described, claimed and illustrated in the accompanying drawing, in which, Figure 1 is a vertical sectional view of a turbine engine constructed in accordance with the preferred embodiment of my invention;

Fig. 2 is a side elevation of the rotary disk or wheel; and

Fig. 3 is a detail horizontal section taken on the line 3—3 of Fig. 2.

Figure 1:
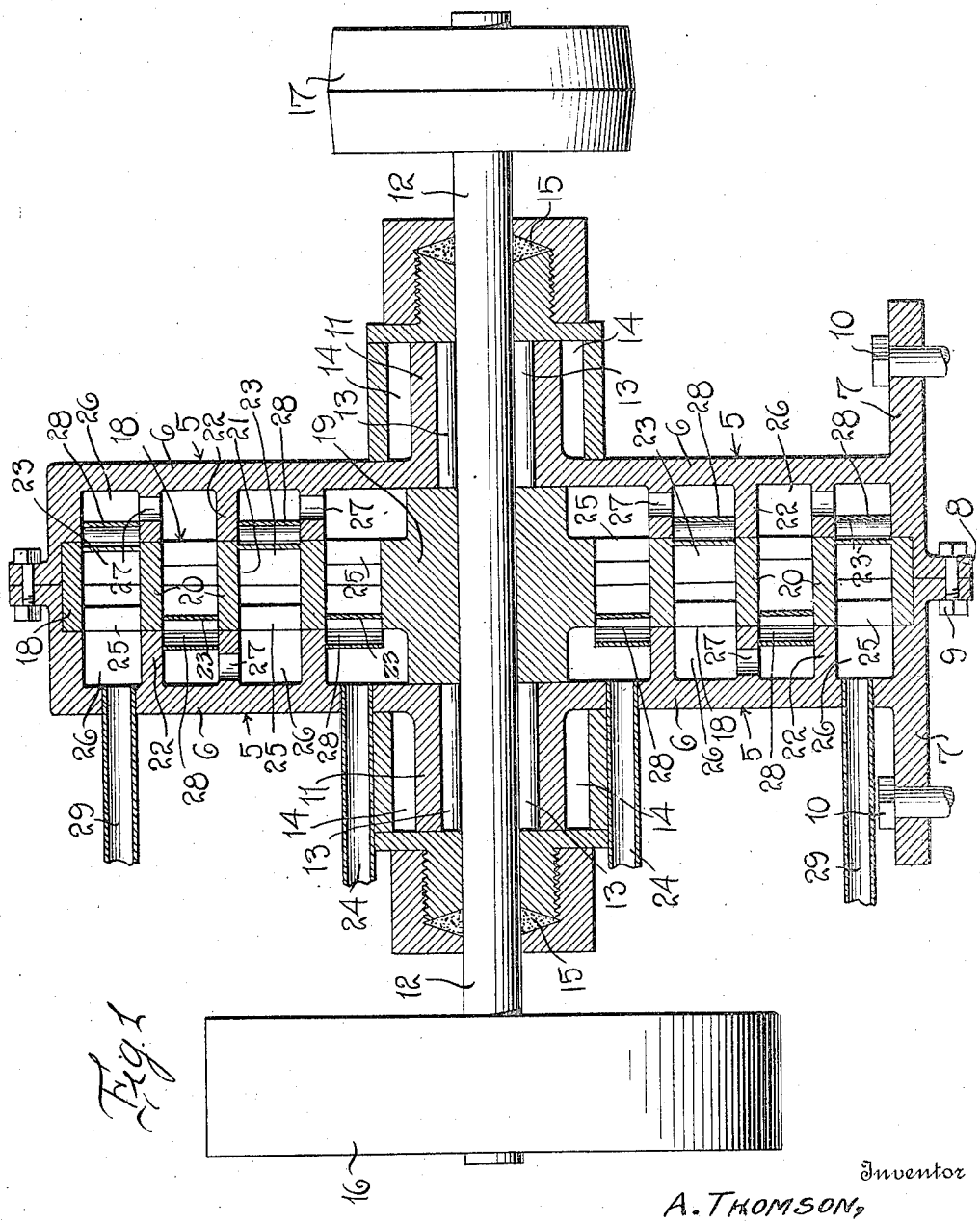

Referring in detail to the drawing, 5 designates the two sections of the engine casing, each of which includes a vertical side wall 6 and a base plate 7. This base plate projects laterally from the inner and outer faces of the side walls 6 and at its inner edge is formed with a depending flange 8. These flanges 8 of the case sections are in abutting engagement when the parts are assembled and securely fastened together by a plurality of bolts 9. The outer edges of the base plate 7 are provided at spaced points with openings to receive the bolts 10 whereby the engine case may be rigidly fixed or anchored to a suitable foundation. Each of the side walls 6 of the engine case is of general circular form and provided at its center with an outwardly projecting bearing box 11 through which the power shaft 12 extends, suitable bearing rollers 13 being arranged between said shaft and the walls of the boxings 11. Each of these bearing boxings is provided with a water jacket, indicated at 14, to cool the bearing, and a stuffing box 15 projects outwardly from each of the bearings and contains a suitable packing gland to prevent the escape of the motive fluid around the shaft 12. One end of the shaft 12 is equipped with a suitable fly wheel 16 and a belt wheel 17 or other element for the transmission of power from said shaft is fixed upon the other end thereof.

The disk or rotor 18 is provided with a central hub 19 keyed or otherwise fixed to the shaft 12 btween the side walls 6 of the engine case. The body of this wheel extending outwardly from the hub 19, is formed with a plurality of annular rectangular open-end channel-shaped portions 20 affording a series of annular chambers 21 which open alternately upon the opposite sides of the disk or rotor. Upon the inner face of each wall 6 of the engine case, a plurality of spaced concentric rings or flanges 22 are integrally formed, the edges of said flanges fitting against the respective faces of the disk or rotor at opposite sides of each of the annular chambers 21 therein. A plurality of blades or vanes 23 properly spaced from each other, are integrally formed with the walls of the annular chambers 21 and extend from the center of the chamber to the open end thereof. These vanes are longitudinally curved or disposed at an inclination in the direction of rotation of the rotor as shown in Fig. 3. 24 designates the inlet pipes for the steam or other motive fluid which are connected to one of the side plates 6 adjacent the bearing 11 and supply the live steam directly to the innermost annular chamber 21. The end wall of each of the annular channel-shaped portions 20 of the rotor is provided with a plurality of spaced openings 25 therein. The space between the several inwardly projecting flanges 22 on the side walls of the engine case affords annular chambers 26; and the chambers 21 of the rotor, opening upon opposite sides thereof, are in registering relation with the alternate chambers 26. The openings 25 in the wheel above referred to afford communication between the chambers 21 in one side of the wheel and the other chambers 26 of the engine case on the opposite side of the wheel. The flanges 22 at the inner side of each of the annular chambers 21 on each side of the rotor are provided with a number of openings 27. Thus, it will be seen that after the motive fluid has been discharged into the innermost chamber 21 and acted against the blades 23, it will pass through the openings 25 into the inner chamber 26 on the opposite side of the wheel and then through the openings 27 in the inner flange 22 and enter the next chamber 21 to continue the original driving impulse against the opposite side of the wheel or rotor. For the purpose of utilizing the full expansive force of the motive fluid, I provide the inclined directing blades or plates 28 arranged between the flanges 22 for directing the steam passing through the openings 27 against the blades 23 of the rotor. This action is continued, the steam passing through the chambers 21 from one side to the other of the rotor and acting against the several series of blades or vanes 23 until the motive fluid finally enters the outermost chamber 26 after acting against the blades 23 and passing through the openings 25. Outlet or exhaust pipes 29 are connected to this latter chamber 26 of the engine case.

From the foregoing description, taken in connection with the accompanying drawing, it is believed that the construction, manner of operation and several advantages of my invention will be clearly and fully understood. A slight leakage of steam or other motive fluid around the edges of the rings or flanges 22 will have no harmful effect upon the operation of the engine, but will only serve to increase the pressure on the succeeding series of vanes or blades 23. By the time the steam reaches the outermost chamber 21, it is so expanded that the leakage, if any, around the edge of the rotor is negligible. It is thus seen that the use of packing is avoided, except in the stuffing boxes, though even here the leakage would be very small as the hub of the wheel or rotor and the shaft would have a close working fit in the engine case. It is, of course, manifest that any desired extent of expansion of the motive fluid may be obtained by multiplying the number of annular chambers 21 in the rotor and correspondingly increasing the number of rings or flanges 22 on the walls of the engine case. The engine may also be operated for any purpose by the use of water under pressure in place of steam.

I also contemplate using the invention as a muffler for gasolene engines, for which purpose it may be serviceably employed by omitting the shaft bearings from the engine case and bolting the casing securely to the case of the ordinary gasolene engine, the wheel or rotor being keyed upon the engine shaft. The exhaust of the engine is then connected up to the supply or feed pipe 24 so that the exhaust is delivered into the innermost chamber 21 of the rotor and passes therefrom through the several other chambers in the manner above explained, gradually expanding and acting against the blades 23 to impart a driving impulse to the engine shaft. Thus, by the time the exhaust gases pass off through the pipe 29, they will have almost entirely lost their force or pressure, and will be discharged to the atmosphere without noise. In this manner, it is apparent that the full power of the ordinary gasolene vehicle engine may be utilized and waste of energy through the exhaust entirely obviated.

While I have above disclosed the present preferred construction of the several parts of my improved engine, it is to be understood that the same is susceptible of considerable modification therein and I, therefore, reserve the privilege of adopting all such legitimate changes as may be fairly embodied within the spirit and scope of the invention as claimed.

Having thus fully described my invention, what I desire to claim and secure by Letters Patent is:—

The combination of a casing, a power shaft mounted therein, a rotor fixed upon the shaft within said casing and having a plurality of annular, channel-shaped portions affording a series of annular chambers alternately arranged upon opposite sides of the rotor, spaced, inclined blades arranged in each of said chambers, said wheel at the exhaust side of each of the annular chambers being provided with openings, laterally projecting, annular flanges extending inwardly from each side of the engine case and contacting at their edges with the rotor between the chamber walls thereof and separating the annular chambers from each other, the flange at the inner side of each chamber in the rotor being provided with openings for the admission of the motive fluid to the chambers of the rotor, fluid directing blades disposed between the flanges on the rotor case, a motive fluid supply means directing the motive fluid to the innermost chamber of the rotor to act against the blades therein and pass through the exhaust openings of the chamber to the opposite side of the rotor and alternately act upon the succeeding annular series of rotor blades, and an exhaust pipe connected to the outermost chamber of the rotor.

In testimony whereof I hereunto affix my signature in the presence of two witnesses.

ALEXANDER THOMSON.

Witnesses:
J. C. GUNN,
A. A. WENTZ.

Copies of this patent may be obtained for five cents each, by addressing the "Commissioner of Patents, Washington, D. C."